US008913657B2

(12) United States Patent
Sung et al.

(10) Patent No.: US 8,913,657 B2
(45) Date of Patent: Dec. 16, 2014

(54) VIRTUAL VIEW IMAGE SYNTHESIS METHOD AND APPARATUS (75) Inventors: Jae Won Sung, Seoul (KR); Yong Joon Jeon, Seoul (KR); Byeong Moon Jeon, Seoul (KR); Jae Hyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 13/126,088

(22) PCT Filed: Oct. 27, 2009

(86) PCT No.: PCT/KR2009/006229
§ 371 (c)(1),
(2), (4) Date: Jul. 11, 2011

(87) PCT Pub. No.: WO2010/050728
PCT Pub. Date: May 6, 2010

(65) Prior Publication Data
US 2011/0255592 A1 Oct. 20, 2011

Related U.S. Application Data (60) Provisional application No. 61/108,856, filed on Oct. 27, 2008, provisional application No. 61/169,321, filed on Apr. 15, 2009, provisional application No. 61/180,120, filed on May 20, 2009.

(51) Int. Cl.
H04N 7/26 (2006.01)
H04N 19/00 (2014.01)
H04N 19/597 (2014.01)
H04N 13/00 (2006.01)

(52) U.S. Cl.
CPC ..... *H04N 7/26946* (2013.01); *H04N 19/00769* (2013.01); *H04N 13/0011* (2013.01)
USPC .................................................... 375/240.02

(58) Field of Classification Search
CPC .................................................. H04N 13/0011
See application file for complete search history.

(56) References Cited

U.S. PATENT DOCUMENTS 7,221,366 B2 * 5/2007 Uyttendaele et al. ......... 345/427
7,561,620 B2 * 7/2009 Winder et al. ........... 375/240.12
(Continued)

FOREIGN PATENT DOCUMENTS

KR 10-20080015714 A 2/2008

OTHER PUBLICATIONS

Na et al., "Multi-view Depth Video Coding using Depth View Synthesis," Gwangju Institute of Science and Technology, IEEE International Symposium on Circuits and Systems, May 18, 2008, ISBN: 978-1-4244-1683-7.*

(Continued)

*Primary Examiner* — Andy Rao
*Assistant Examiner* — Tyler Edwards
(74) *Attorney, Agent, or Firm* — Fish & Richardson P.C.

(57) ABSTRACT

The virtual view image synthesis method according to the present invention comprises: generating an intermediate picture from a first viewpoint and an intermediate picture from a second viewpoint by swapping a reference picture from a first viewpoint and a reference picture from a second viewpoint; determining whether there is a hole in said intermediate picture from a first viewpoint; if there is a hole in said intermediate picture from a first viewpoint, obtaining the pixel value of said intermediate picture from a second viewpoint based on the location of said hole; and allocating the pixel value of said intermediate picture from a second viewpoint to said hole. A virtual picture is synthesized using a reference picture, thereby reducing the quantity of information due to encoding a virtual viewpoint picture.

4 Claims, 8 Drawing Sheets

(56) References Cited

U.S. PATENT DOCUMENTS

2006/0146138 A1    7/2006    Xin et al.
2007/0109300 A1    5/2007    Li
2010/0074334 A1    3/2010    Jeon et al.

OTHER PUBLICATIONS

European Search Report dated Aug. 16, 2012 for Application No. 09823808, 8 pages.

Cheon Lee, et al.; "View Synthesis Tools for 3D Video", 86. MPEG Meeting; Oct. 13-17, 2008; Busan; (Motion Picture Expert Group or ISO/IEC JTC1/SC29/WG11), No. M15851, Oct. 9, 2008, XP030044448.

Mark W. R., et al.; "Post-Rendering 3D Warping", Proceedings of 1997 Symposium on Interactive 3D Graphics Apr. 27-30, 1997 Providence, RI, USA; [Proceedings of the Symposium on Interactive 3D Graphics], Proceedings 1997 Symposium on Interactive 3D Graphics ACM New York, NY, USA, Apr. 27, 1997, pp. 7-16, XP000725355, DOI: 10.1145/253284.253292 ISBN: 978-0-89791-884-8.

Sang-Tae NA, et al.; "Joint coding of multi-view video and corresponding depth map", Image Processing, 2008. ICIP 2008. 15th IEEE International Conference, IEEE, Piscataway, NJ, USA, Oct. 12, 2008, pp. 2468-2471, XP031374540, DOI:10.1109/ICIP.2008.4712293 ISBN:978-1-4244-1765-0.

Sang-Tae NA, et al.; "Multi-view depth video coding using depth view synthesis", Circuits and Systems, 2008. ISCAS 2008. IEEE International Symposium on, IEEE, Piscataway, NJ, USA, May 18, 2008, pp. 1400-1403, XP031392244, DOI:10.1109/ISCAS.2008.4541689 ISBN:978-1-4244-1683-7.

Jaewon Sung, et al.; "Improved view synthesis algorithm", 86. MPEG Meeting; Oct. 13-17, 2008; Busan; (Motion Picture Expert Group or ISO/IEC JTC1/SC29/WG11), No. M15888, Oct. 20, 2008, XP030044485.

International Search Report dated Jun. 14, 2010 for Application No. PCT/KR2009/006229, with English translation, 4 pages.

\* cited by examiner

| S800 | set ccmask(x,y)=0;<br>for each pixel of ccmap(x,y){<br>if(ccmap(x,y)==i) ccmask(x,y)=1;<br>} |
|---|---|
| | : |
| S810 | Depth |
| | : |
| S820 | sum=0;<br>count=0;<br>for(x=0;x<width;x++){<br>for(y=0;y<height;y++){<br>if(neighbor_mask(x,y)==1) {sum=LC'(x,y)-RC'(x,y);count++;}<br>}<br>}<br>if(count>0) color offset=sum/count; |
| | : |
| S830 | for(x=0;x<width;x++){<br>for(y=0;y<height;y++){<br>if(ccmask(x,y)==1){<br>LC'(x,y)=RC'(x,y)+color offset;<br>: |

VIRTUAL VIEW IMAGE SYNTHESIS METHOD AND APPARATUS

BACKGROUND OF THE INVENTION

1. Field of the Invention

The present invention relates to video signal coding.

2. Discussion of the Related Art

Compression coding indicates a series of signal processing technologies used to transmit digitized information through a communication line or to store the digitized information in a specific form suitable for a storage medium. A variety of objects can be compression-coded, for example, sound data, image (or video) data, text data, etc. Particularly, technology for compression encoding image data is called image compression technology. Video data is characterized in that it has spatial redundancy and temporal redundancy.

SUMMARY OF THE INVENTION

Accordingly, the present invention is directed to a method and apparatus for synthesizing a virtual view image that substantially obviate one or more problem due to limitations and disadvantages of the related art.

An object of the present invention is to provide a method and apparatus for generating an intermediate picture by warping a reference picture, and generating a virtual picture by merging the intermediate picture.

Another object of the present invention is to provide a video signal processing method used when warping reference pictures, so as to warp a pixel of the reference picture to a pixel of the intermediate picture using depth information corresponding to a pixel of the reference picture.

Another object of the present invention is to provide a video signal processing method used when warping reference pictures. In detail, if one or more reference picture pixels are mapped to one intermediate picture pixel, the video signal processing method obtains the result of comparison of depth information of the one or more reference picture pixels, and warps the reference picture pixel selected according to the comparison result to the intermediate picture pixel.

Another object of the present invention is to provide a video signal processing method used when a hole is present in an intermediate picture of a first viewpoint, such that the hole is filled using a pixel of an intermediate picture of a second viewpoint located at the same position as the hole.

A further object of the present invention is to provide a video signal processing method used when a hole is present in an intermediate picture of a first viewpoint, such that the hole is filled using a pixel contiguous to the hole and a pixel of an intermediate picture of a second viewpoint located at the same position as the pixel contiguous to the hole.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing a video signal includes: generating a first viewpoint intermediate picture and a second viewpoint intermediate picture by warping a first viewpoint reference picture and a second viewpoint reference picture; determining whether a hole is present in the first viewpoint intermediate picture; specifying a position of the hole when the hole is present in the first viewpoint intermediate picture; obtaining a pixel value of the second viewpoint intermediate picture on the basis of the hole position; and allocating a pixel value of the second viewpoint intermediate picture to the hole, wherein the hole is a specific region in which no pixel value is allocated to the first viewpoint intermediate picture.

The first viewpoint reference picture and the second viewpoint reference picture may be distinguished from each other by viewpoint information, wherein the viewpoint information may be used to identify a viewpoint to which the reference picture pertains.

The pixel value of the second viewpoint intermediate picture may be obtained from a pixel located at the same position as the hole position.

The allocating of the pixel value of the second viewpoint intermediate picture to the hole further may include obtaining a difference in pixel value between a pixel contiguous to the hole and a pixel of the second viewpoint intermediate picture that is located at the same position as the pixel contiguous to the hole, wherein one value is allocated to the hole using the difference in pixel value.

The pixel contiguous to the hole may include pixels which are located at a left side, a right side, an upper side, a lower side, a left upper side, a left lower side, a right upper side, and a right lower side of the hole.

The hole may be assigned the sum of an average of differences in pixel value and a pixel value of the second viewpoint intermediate picture.

The generating of the first viewpoint intermediate picture and the second viewpoint intermediate picture by warping the first viewpoint reference picture and the second viewpoint reference picture may include, if pixels of one or more first viewpoint reference pictures are mapped to a pixel of the first viewpoint intermediate picture, warping an average of pixel values of the one or more first viewpoint reference pictures using a pixel value of the first viewpoint intermediate picture.

The generating of the first viewpoint intermediate picture and the second viewpoint intermediate picture by warping the first viewpoint reference picture and the second viewpoint reference picture may include, if a pixel of at least one first viewpoint reference picture is mapped to a pixel of the first viewpoint intermediate picture, comparing depth information of pixel of the first viewpoint reference picture, and warping a pixel of the first viewpoint reference picture having the smallest depth information from among depth information using a pixel of the first viewpoint intermediate picture.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
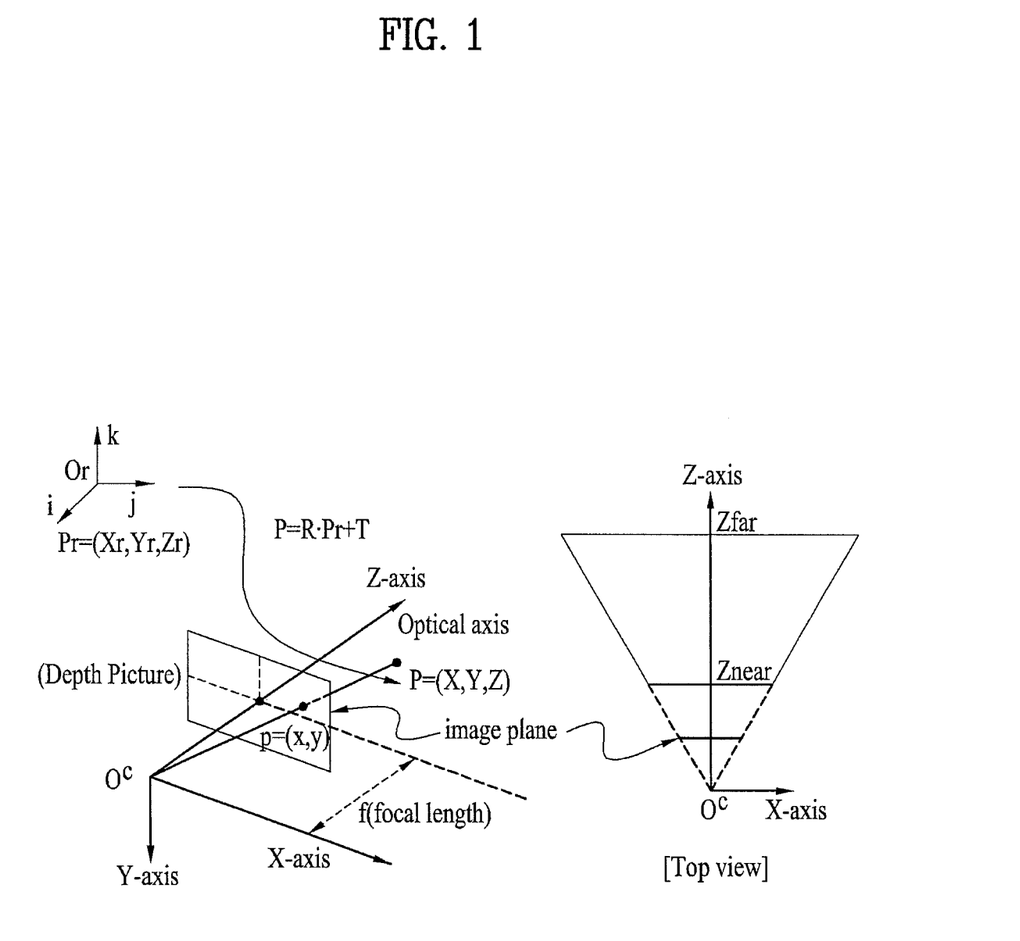
FIG. 1 is a conceptual diagram illustrating a depth according to an embodiment of the present invention.

Compression coding technology for video signal or data considers spatial redundancy, temporal redundancy, scalable redundancy, and inter-viewpoint redundancy. When coding a depth picture so as to implement a 3D display based on a multi-viewpoint image, the present invention can compression coding the video signal or data in consideration of spatial redundancy, temporal redundancy, etc. The compression coding technology may be applied to an image sequence composed of depth pictures, an image sequence composed of color pictures, and an image sequence composed of color pictures and depth pictures. In this case, the term 'depth' may be a difference in disparity caused by a difference in viewpoint, and a detailed description of the depth is shown in FIG. 1. In the following embodiments of the present invention, depth information, depth data, depth picture, depth sequence, depth coding, depth bitstream, etc. may be interpreted as depth-associated information according to definition of the depth. In addition, the term 'coding' may include both encoding and decoding, and may be flexibly interpreted according to the technical scope and range of the present invention.

A bitstream of a video signal is defined as a separated hierarchical layer structure that is called a Network Abstraction Layer (NAL) located between a Video Coding Layer (VCL) for handling motion image coding processing and a lower system for transmitting and storing coded information. The coding process outputs VCL data as an output signal, and is mapped in units of an NAL prior to transmission or storage of data. Each NAL unit includes a Raw Byte Sequence Payload (RBSP) corresponding to either compressed video data or header information. The RBSP means the moving image compression resultant data.

The NAL unit is basically composed of a NAL header and an RBSP. The NAL header includes not only flag information (nal_ref_idc) indicating whether a slice serving as a NAL-based reference picture is included, but also ID information (nal_unit_type) indicating the type of NAL unit. RBSP stores compressed original data, and an RESP trailing bit is added to the end of the RBSP that the RBSP length is a multiple of 8 bits. There are a variety of types in such an NAL unit, for example, an Instantaneous Decoding Refresh (IDR) picture, a Sequence Parameter Set (SPS), a Picture Parameter Set (PPS), Supplemental Enhancement Information (SEI), etc.

In addition, current standards restrict a target or objective product to several profiles and levels in such a manner that the product can be implemented at appropriate cost. It is necessary for a decoder to satisfy predetermined restrictions at a corresponding profile and level. In order to represent functions and parameters of the decoder, two concepts (i.e., a profile and a level) are defined so that the range of a certain compressed image capable of being handled by the decoder can be recognized. Information about which profile incurs a basis of a bitstream can be identified by a profile ID (profile_idc). The profile ID means a flag indicating a profile on which a bitstream is based. For example, in the case of H.264/AVC, a profile ID of 66 means that a bitstream is based on a base line profile, a profile ID of 77 means that a bitstream is based on a main profile, and a profile ID of 88 means that a bitstream is based on an extended profile. The profile ID may be contained in a Sequence Parameter Set (SPS).

Accordingly, in order to deal with an image sequence (hereinafter referred to as a depth sequence) including one or more depth pictures, one embodiment of the present invention needs to identify whether an input bitstream relates to a profile of a depth sequence. If the input bitstream is identified as the profile of the depth sequence, one embodiment of the present invention needs to add a syntax in such a manner that at least one additional information related to depth coding can be transmitted. In this case, the profile of the depth sequence indicates an additional H.264/AVC technology, may indicate a profile mode for dealing with the depth picture or may also indicate a profile mode related to a multi-viewpoint video (also called a multiview video) including a depth picture. Since depth coding is an additional technology for the conventional AVC technology, a technology for adding a syntax used as additional information for a depth coding mode may be more efficient than unconditional syntax addition. For example, provided that information regarding the depth coding is added when the AVC profile identifier (ID) indicates a profile of a depth sequence, coding efficiency can be increased.

The sequence parameter set (SPS) means header information including information related to the coding of the entire sequence. For example, a profile, a level, etc. may be contained in the header information. The entire compressed moving image, i.e., a sequence, must inevitably start from a sequence header, so that the sequence parameter set (SPS) corresponding to header information must arrive at a decoder at an earlier time than data referring to the parameter set. In conclusion, RBSP of the sequence parameter set is used as header information for the compressed moving image data. If a bitstream is received, a profile ID identifies which profile is related to an input bitstream. Accordingly, a specific part (for example, "If (profile_idc==DEPTH_PROFILE)") indicating whether an input bitstream relates to a profile of the depth sequence is added to a syntax, such that it can be identified whether the input bitstream relates to the profile of the depth sequence, and a variety of attribute information can be added to the syntax only when the input bitstream relates to the depth sequence profile only. For example, the number of overall viewpoints of the depth sequence, the number of depth-view reference pictures, and viewpoint ID numbers of the depth-view reference pictures may be added to the syntax. In addition, the decoded picture buffer may use information regarding the depth-view reference picture so as to generate and manage the list of reference pictures FIG. 1 is a conceptual diagram illustrating a depth according to an embodiment of the present invention.

Referring to FIG. 1, the term "depth" may indicate a difference in disparity between image sequences captured by a plurality of cameras, the difference in disparity being caused by a difference in viewpoint between such image sequences. Referring to FIG. 1, the camera position ($0^C$) is the origin of a 3D camera coordinate system, and a Z-axis (optical axis) is arranged in a straight line with the viewing direction of the user's eyes. One arbitrary point P=(X,Y,Z) of the camera coordinate system may be projected on one point p=(x,y) of a 2D image plane perpendicular to the Z-axis.

In this case, the point 'p=(x,y)' on a 2D image plane may be represented by a color value of the point 'P=(X,Y,Z)' of a 3D coordinate system. In this case, the 2D image plane may denote a color picture. In addition, the point 'p=(x,y)' on the 2D image plane may be represented by a Z value of the point 'P=(X,Y,Z)' of the 3D coordinate system. In this case, the 2D image plane may represent a depth picture. In this case, the focal length (f) may represent the distance between the camera position and the image plane.

In addition, the point 'P=(X,Y,Z)' of the 3D coordinate system may represent one arbitrary point of the camera coordinate system. However, if the point 'P=(X,Y,Z)' is captured by a plurality of cameras, a common reference coordinate system for the plurality of cameras may be needed. In FIG. 1, an arbitrary point for use in a reference coordinate system that uses a point of 0w as a reference may be represented by Pw=(Xw,Yw,Zw). Pw=(Xw,Yw,Zw) may be converted into one arbitrary point 'P=(X,Y,Z)' of the camera coordinate system using a 3×3 rotation matrix (R) and a (3×1) translation vector (T). For example, P may be represented by Equation 1.

$$P=R*Pw+T \quad \text{[Equation ]}$$

When re-defining a depth picture or a depth map on the basis of the above-mentioned description, the depth picture or the depth map may be a set (or aggregate) of distance information obtained when a distance from a camera to an actual object (target) is numerically represented as a relative value on the basis of the camera position. The depth picture or the depth map may also be denoted by a picture unit, a slice unit, etc. In the depth picture or the depth map, depth information may be represented in units of a pixel.

Depth information of the depth picture may be obtained from a Z value of a 3D coordinate 'P=(X,Y,Z)' of the camera coordinate system corresponding to a pixel of a color picture. The Z value may be contained in the range of a real number, and is quantized to any value contained in the real number range such that the quantized Z value may be used as depth information of the depth picture. For example, the depth information of the depth picture may be represented by the following equation 2 or 3.

$$Zq=\text{round}(255*(Z-Znear)/(Zfar-Znear)) \quad \text{[Equation 2]}$$

$$Zq=\text{round}(255*(1/Z-1/Zfar)/(1/Znear-1/Zfar)) \quad \text{[Equation 3]}$$

In Equation 2 or 3, 'Zq' may be quantized depth information. Referring to the top view of FIG. 1, 'Znear' is the lower limit of a Z-axis value, and 'Zfar' is the upper limit of a Z-axis value. In Equation 2 or 3, the quantized depth information may have an integer of 0 to 255.

As described above, the depth picture or the depth map may be encoded with an image sequence of the color picture or be encoded differently from the image sequence of the color picture. In this case, a variety of embodiments of the present invention may be used to be compatible with a conventional codec. For example, depth coding technology may be used as additional technology so as to be compatible with the H.264 codec, may be used as an extended technology within the H.264/AVC multiview video coding, or may be used as an extended technology within scalable video coding. In addition, the depth coding technology may also be used as a separate codec technology that is capable of coding only the image sequence including a depth picture. Detailed embodiments for such depth coding according to the present invention will be given below.

Figure 2:
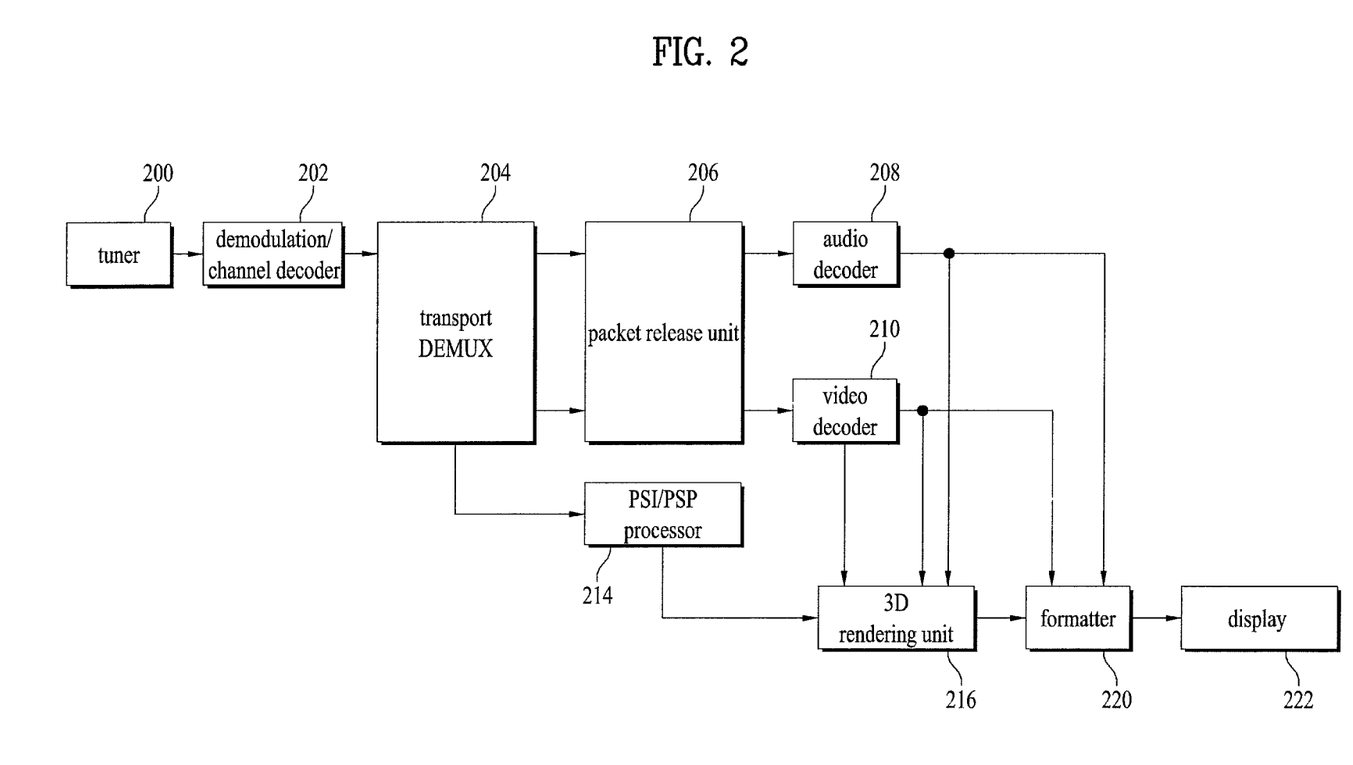
FIG. 2 is a block diagram illustrating a broadcast receiver to which depth coding is applied according to an embodiment of the present invention.

FIG. 2 is a block diagram illustrating a broadcast receiver to which depth coding is applied according to an embodiment of the present invention.

Referring to FIG. 2, the broadcast receiver according to the present invention is used to reproduce an image by receiving over-the-air broadcast signals. The broadcast receiver may generate a 3D content using the received depth-associated information. The broadcast receiver includes a tuner 200, a demodulation/channel decoder 202, a transport demultiplexer (DEMUX) 204, a packet release unit 206, an audio decoder 208, a video decoder 210, a PSI/PSIP processor 214, a 3D rendering unit 216, a formatter 220, and a display 222.

The tuner 200 selects a broadcast signal of a user-selected channel from among a plurality of broadcast signals received through an antenna (not shown), and outputs the selected broadcast signal. The demodulation/channel decoder 202 demodulates a broadcast signal received from the tuner 200, and performs error correction decoding of the demodulated signal, so that it outputs a transport stream (TS). The transport DEMUX 204 demultiplexes a transport stream (TS) so as to separate a video PES and an audio PES from each other, and extracts PSI/PSIP information. The packet release unit 206 releases packets of a video PES and an audio PES so as to recover the video ES and an audio ES. The audio decoder 208 decodes an audio ES so as to output an audio bitstream. The audio bitstream is converted into an analog audio signal by a digital-to-analog converter (DAC) (not shown), is amplified by an amplifier (not shown), and is then output through a speaker (not shown). The video decoder 210 decodes a video ES so as to recover an original image. The decoding process of the audio decoder 208 or the video decoder 210 may be carried out on the basis of a packet ID (PID) confirmed by the PSI/PSIP processor 214. The video decoder 210 may extract depth information from the decoding process. In addition, additional information needed for generating a virtual camera viewpoint image is extracted, and is then provided to the 3D rendering unit 216. In more detail, camera information, or information (e.g., geometrical information such as an object outline, object transparency information, and color information) for estimating an occlusion region occluded by an object located at a front site is extracted from the decoding process, so that the extracted information can be provided to the 3D rendering unit 216. However, according to another embodiment of the present invention, the depth information and/or the additional information may be isolated by the trasnsport DEMUX 204.

A PSI/PSIP processor 214 receives PSI/PSIP information from the transport DEMUX 204, parses the received PSI/PSIP information, and stores the parsed result in a memory (not shown) or register, such that broadcast data is reproduced on the basis of the stored information. The 3D rendering unit 216 may generate color information and depth information at a virtual camera position using the recovered image, depth information, additional information and a camera parameter.

In addition, the 3D rendering unit 216 performs 3D warping using depth information for the recovered image, such that it can generate a virtual image at a virtual camera position. Although the 3D rendering unit 216 is configured to be separated from the video decoder 210, the scope or spirit of the present invention is not limited thereto, and the 3D rendering unit 216 may also be contained in the video decoder 210.

The formatter 220 formats the recovered image (i.e., an image actually captured by a camera) obtained from the decoding process and a virtual image generated by the 3D rendering unit 216 according to a display scheme for use in the corresponding receiver, and displays a 3D image on the display 222. In this case, depth information and a virtual image are synthesized at a virtual camera position by the 3D rendering unit 216, and image formatting by the formatter 220 may be selectively performed in response to a user command. That is, a viewer may prevent a synthesized image from being displayed by operating a remote controller (not shown), or may indicate a viewpoint at which image synthesizing is to be performed.

As can be seen from the above description, although depth information may be used in the 3D rendering unit 216 so as to generate a 3D image, it should be noted that the depth information may also be used in the video decoder 210 as necessary. A variety of embodiments for enabling the video decoder 210 to use depth information will hereinafter be described.

Figure 3:
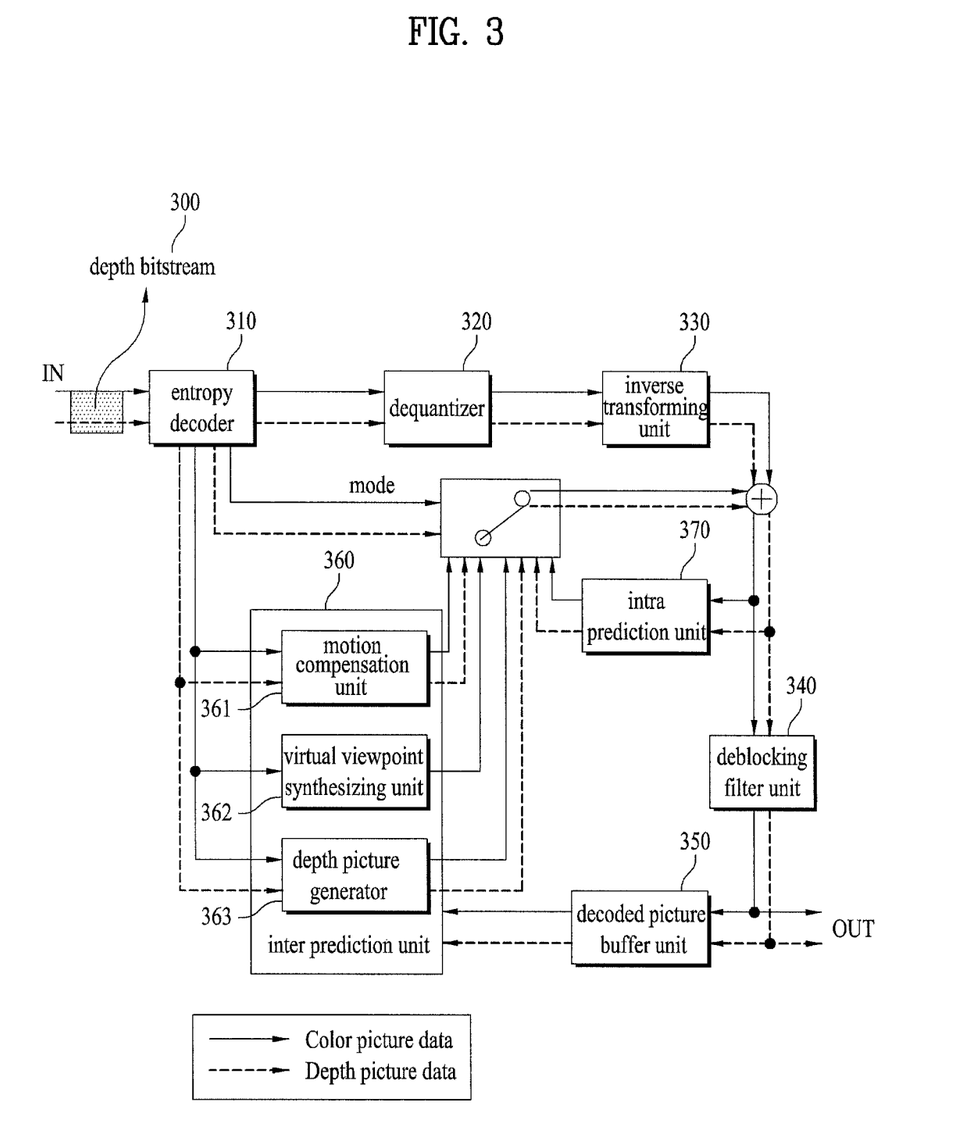
FIG. 3 is a block diagram illustrating a video decoder according to an embodiment of the present invention.

FIG. 3 is a block diagram illustrating a video decoder according to an embodiment of the present invention. The video decoder 210 includes an entropy decoder 310, a dequantizer 320, an inverse transforming unit 330, a deblocking filter unit 340, a decoded picture buffer unit 350, an inter prediction unit 360, and an intra prediction unit 370. In FIG. 3, a solid line denotes flow of color picture data, and a dotted line denotes flow of depth picture data. Although color picture data and depth picture data are displayed to be distinguished from each other, the color picture data and the depth picture data may represent different bitstreams, or may be used to discriminate only the flow of data within one bitstream. That is, the color picture data and the depth picture data may be transmitted through one bitstream or different bitstreams. In FIG. 3, although the color picture data and the depth picture data are exemplarily used to indicate the flow of data, the scope or spirit of the present invention is not limited only to one decoder.

First, data parsing is performed in units of an NAL so as to decode the received depth bitstream 300. In this case, an NAL header region, an extended region of the NAL header, and a sequence header region (e.g., a sequence parameter set), an extended region of a sequence header, a picture header region (e.g., a picture parameter set), an extended region of the picture header, a slice header region, an extended region of the slice header, a slice data region, or a macroblock region may include a variety of depth-associated attribute information. Although depth coding may be used as a separate codec, if the depth coding can be compatible with a conventional codec, adding a variety of depth-associated attribute information may be more efficient only when a depth bitstream is used. For example, depth identification information, that is capable of identifying whether a depth stream is used in the sequence header region (e.g., a sequence parameter set) or an extended region of a sequence header, can be added. According to the depth identification information, attribute information regarding the depth sequence can be added only when the input bitstream is a depth-coded bitstream.

The parsed depth bitstream 300 is entropy-decoded by the entropy decoder 310, and a coefficient of each macroblock, a motion vector, etc. may be extracted. The dequantizer 320 obtains a converted coefficient value by multiplying a predetermined constant by the received quantized value. The inverse transforming unit 330 inversely transforms the coefficient value so as to recover depth information of the depth picture. The intra prediction unit 370 performs intra-frame prediction using the recovered depth information of the current depth picture. On the other hand, the deblocking filter unit 340 may apply deblocking filtering to each coded macroblock so as to reduce block distortion. The filter softens a block edge so as to improve an image quality of a decoded frame. Selection of the filtering process may depend upon boundary strength and a gradient of image samples located in the vicinity of a boundary. Filtered depth pictures are stored in the decoded picture buffer unit 500 so that the filtered pictures can be output or used as reference pictures.

The decoded picture buffer unit 350 may store or open pre-coded depth pictures so as to perform inter-frame prediction. In this case, in order to store or open the pre-coded depth pictures in the decoded picture buffer unit 350, a frame number (frame num) and Picture Order Count (POC) of each picture are used. Therefore, since depth pictures located at viewpoints different from a viewpoint of a current depth picture are present in the pre-encoded pictures, the frame number (frame num), the POC, and depth viewpoint information identifying a viewpoint of the depth picture may be simultaneously utilized so as to use such pictures as reference pictures.

In addition, the decoded picture buffer unit 350 may use information regarding a depth viewpoint so as to generate a reference picture list for inter-view prediction of the depth picture. For example, the decoded picture buffer unit 350 may use depth-view reference information. The depth-view reference information may denote information for indicating the relationship between viewpoints of depth pictures. For example, the depth-view reference information may include the number of overall depth viewpoints, a depth-view ID number, the number of depth-view reference pictures, and an ID number for identifying a depth viewpoint of the depth-view reference picture.

The decoded picture buffer unit 350 manages a reference picture to more flexibly implement intra-frame prediction. For example, a memory management control operation method and a sliding window method may be used by the decoded picture buffer unit 350, such that a memory of a reference picture and a memory of a non-reference picture are managed as one memory and can be effectively managed using a small number of memories. In the depth coding, depth pictures may be assigned with different marks so as to be distinguished from color pictures in the decoded picture buffer unit, and information for identifying each depth picture may be used in the marking process. Reference pictures managed through the above-mentioned process may also be used for depth coding by the inter prediction unit 360.

Referring to FIG. 3, the inter prediction unit 360 may include a motion compensation unit 361, a virtual viewpoint synthesizing unit (also called a virtual view synthesizing unit) 362 and a depth picture generator 363.

The motion compensation unit 361 compensates for a motion of a current block using information transmitted from the entropy decoding unit 310. The motion compensation unit 361 extracts a motion vector of each block contiguous to a current block from a video signal, and obtains a motion vector prediction value of the current block. Upon receiving the motion vector prediction value and a differential vector extracted from the video signal, the motion compensation unit 361 compensates for the motion of the current block. In addition, the motion compensation may be performed using one reference picture or a plurality of pictures. In the depth coding, if the current depth picture refers to a depth picture of a different viewpoint, the motion compensation unit 361 can perform motion compensation using information regarding the reference picture list for inter-view prediction of depth pictures stored in the decoded picture buffer unit 350. In addition, the motion compensation unit 361 may also perform motion compensation using depth-view information capable of identifying a viewpoint of the depth picture.

In addition, the virtual-view synthesizing unit 362 synthesizes a virtual-viewpoint color picture using a color picture of a viewpoint contiguous to a viewpoint of the current color picture. To use color pictures of contiguous viewpoints or to use each color picture of a desired viewpoint, viewpoint identification information indicating a viewpoint of the color picture may be used. When generating the color picture of the virtual viewpoint, flag information indicating whether to generate a color picture of the virtual viewpoint may be defined. If the flag information indicates generation of the virtual viewpoint color picture, a virtual-view color picture can be generated using the viewpoint identification information. The virtual view color picture obtained through the virtual view synthesizing unit 362 may be used as a reference picture. Of course, the viewpoint ID information may also be allocated to the virtual view color picture.

In accordance with another embodiment of the present invention, the virtual view synthesizing unit 362 may synthesize a virtual view depth picture using a depth picture of a viewpoint contiguous to a viewpoint of a current depth picture. Likewise, depth viewpoint ID information may be used to indicate a viewpoint of the depth picture. In this case, the depth viewpoint ID information may be derived from viewpoint ID information of corresponding color picture. For example, the corresponding color picture may have the same picture output order and the same viewpoint ID information as in the current depth picture.

The depth picture generator 363 may generate a current depth picture using depth coding information. In this case, the depth coding information may include a variable of a distance (e.g., a Z-axis value on a camera coordinate system) from a camera to an object, macroblock type information for depth coding, information identifying a boundary contained in a depth picture, information indicating whether data contained in the RBSP includes depth-coded data, and information indicating whether the data type is depth picture data, color picture data, or parallax data. In addition, the depth picture generator 363 may predict a current depth picture using the depth coding information. In other words, the depth picture generator 363 may perform inter prediction using a depth picture contiguous to a current depth picture, and may also perform intra prediction using decoded depth information contained in the current depth picture.

A method for synthesizing a virtual picture according to embodiments of the present invention will hereinafter be described with reference to the annexed drawings.

Figure 4:
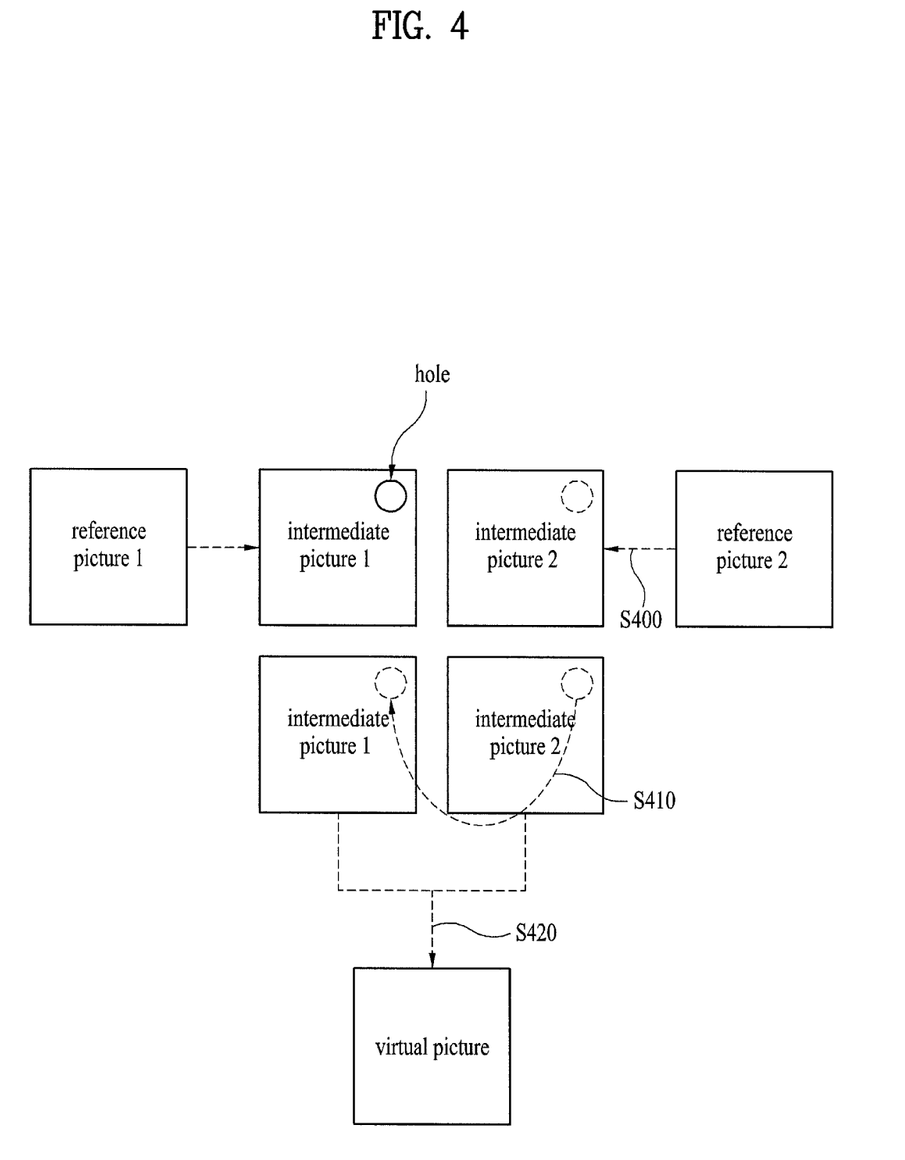
FIG. 4 is a conceptual diagram illustrating a method for synthesizing a virtual picture from a picture contiguous to a virtual picture according to an embodiment of the present invention.

FIG. 4 is a conceptual diagram illustrating a method for synthesizing a virtual picture from a picture contiguous to a virtual picture according to an embodiment of the present invention.

Referring to FIG. 4, a picture (hereinafter referred to as a reference picture) contiguous to the virtual picture is warped in step S400. The warped reference picture (hereinafter referred to as an intermediate picture) is merged in such a manner that picture synthesizing is performed in step S420. Hereinafter, it should be understood that a pre-synthezied virtual picture is contained in the reference picture. From the standpoint of a picture type, the reference picture may be a reference color picture or a reference depth picture, and the virtual picture may be a virtual color picture or a virtual depth picture.

The term "warping" means a process for obtaining an intermediate picture pixel position corresponding to a reference picture pixel position, and determining a pixel value corresponding to the intermediate picture using a pixel value of the reference picture. In the following description, it should be understood that the pixel value conceptually includes color- or depth-information allocated to the pixel position FIG. 5 is a conceptual diagram illustrating a method for obtaining an intermediate picture pixel position corresponding to a reference picture pixel position according to an embodiment of the present invention.

Figure 5:
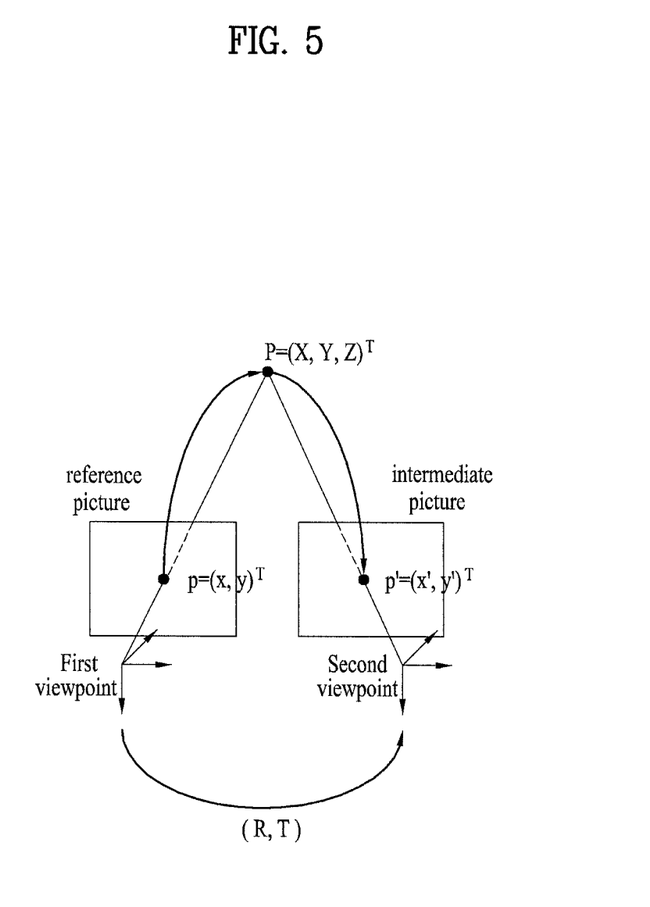
FIG. 5 is a conceptual diagram illustrating a method for obtaining an intermediate picture pixel position corresponding to a reference picture pixel position according to an embodiment of the present invention.

Referring to FIG. 5, a first viewpoint spatial position can be obtained using both a pixel position of the first viewpoint reference picture and depth information of a reference picture that is located at the same position as in the pixel of the reference picture. The first viewpoint spatial position information may represent a 3D position to which a pixel of the first viewpoint reference picture is mapped on the basis of the first viewpoint. For example, if a 2D coordinate of the first viewpoint reference picture is denoted by 'p=(x,y)' and depth information of the reference picture corresponding to the 2D coordinate 'p=(x,y)' is denoted by Z(p), a 3D coordinate on the camera coordinate system can be obtained. The 3D coordinate system P can be obtained as shown in Equation 4.

$$P = ZK^{-1}\bar{p} \quad \text{[Equation 4]}$$

In Equation 4, K is a (3×3) internal parameter of a first viewpoint camera, and $\bar{p}$ is a homogenous coordinate of the 3D coordinate (p).

The first viewpoint spatial position is position information of one object on the basis of the first viewpoint, such that it is necessary for the first viewpoint spatial position to be converted into a 3D position (hereinafter referred to as a 'virtual viewpoint spatial position') on the basis of a virtual viewpoint. For example, assuming that the virtual viewpoint spatial position is denoted by P', P' may be calculated by the following equation 5 using a (3×3) rotation matrix (R) and a (3×1) translation vector (T).

$$P'(X',Y',Z') = R*P + T \quad \text{[Equation 5]}$$

In addition, a specific position where the virtual viewpoint spatial position is projected on the intermediate picture is obtained. For convenience of description, the specific position is called a 'pixel position corresponding to the intermediate picture'. For example, assuming that the pixel position corresponding to the intermediate picture is denoted by p'=(x',y'), p' may be derived from the P' value and an internal parameter K' of the virtual viewpoint camera as shown in the following equation 6.

$$Z\bar{p}' = K'P'$$

Therefore, a pixel value of the first viewpoint reference picture is allocated to a corresponding pixel of the intermediate picture on the basis of the above-mentioned position in such a manner that picture warping is performed.

A method for warping an intermediate picture from a first viewpoint reference picture according to another embodiment of the present invention will hereinafter be described.

For convenience of description and better understanding, if multiple viewpoints (i.e., a multi-viewpoint) are present, it is assumed that the multiple viewpoints are arranged at the same X axis of the camera coordinate system and have Z axes parallel to one another. If the pixel position p=(x,y) of the first viewpoint reference picture is compared with the corresponding pixel position p'=(x',y) of the intermediate picture, it can be recognized that different x values are assigned to p=(x,y) and p'=(x',y) whereas the same y value is assigned to p=(x,y)

and p'=(x',y). Therefore, the corresponding pixel position of the intermediate picture can be obtained from a pixel position of the first viewpoint reference picture using a difference (hereinafter referred to as 'd') between the x values. For example, d may be calculated by the following equation 7 using a focal length (f) of the first viewpoint camera and a distance (B) between the first viewpoint camera and the virtual viewpoint camera.

$$d=(f*B)/Z \quad \text{[Equation 7]}$$

In Equation 7, Z is depth information of a first viewpoint reference depth picture corresponding to a pixel of the first viewpoint reference color picture. If the quantized depth information is used as depth information of the first viewpoint reference depth picture, Z can be represented by the following equation 8 using the quantized depth information.

$$Z=1/\{Zq/255*(1/Znear-1/Zfar)\} \quad \text{[Equation 8]}$$

In Equation 7, Znear is the lower limit of a Z-axis value of the 3D coordinate (P) of the camera coordinate system, and Zfar is the upper limit of the Z-axis value.

The position of the intermediate picture pixel corresponding to the first viewpoint reference picture pixel can be obtained using the 'd' value. For example, a 2D coordinate (x', y) of the intermediate picture corresponding to the 2D coordinate (x, y) of the first viewpoint reference picture may be obtained by adding the 'd' value to the 2D coordinate (x, y), as denoted by x'=x+d. However, the pixel position of the intermediate picture may be set to a 2 coordinate (x', y) decided by the 'd' value, and may be set to any pixel position close to the 2D coordinate (y). If x' is an integer, the pixel position of the intermediate picture may be set to 2D coordinate (x', y). If x' is a real number, a 2D coordinate obtained by the rounding-off operation of the x' value may be set to the pixel position of the intermediate picture. A pixel value of the first viewpoint reference picture is allocated to the pixel of the intermediate picture.

A few pixels of the reference picture may correspond to one pixel of the intermediate picture. In this case, warping may be performed in consideration of the 2D coordinate of the intermediate picture corresponding to the pixel of the reference picture.

Figure 6:
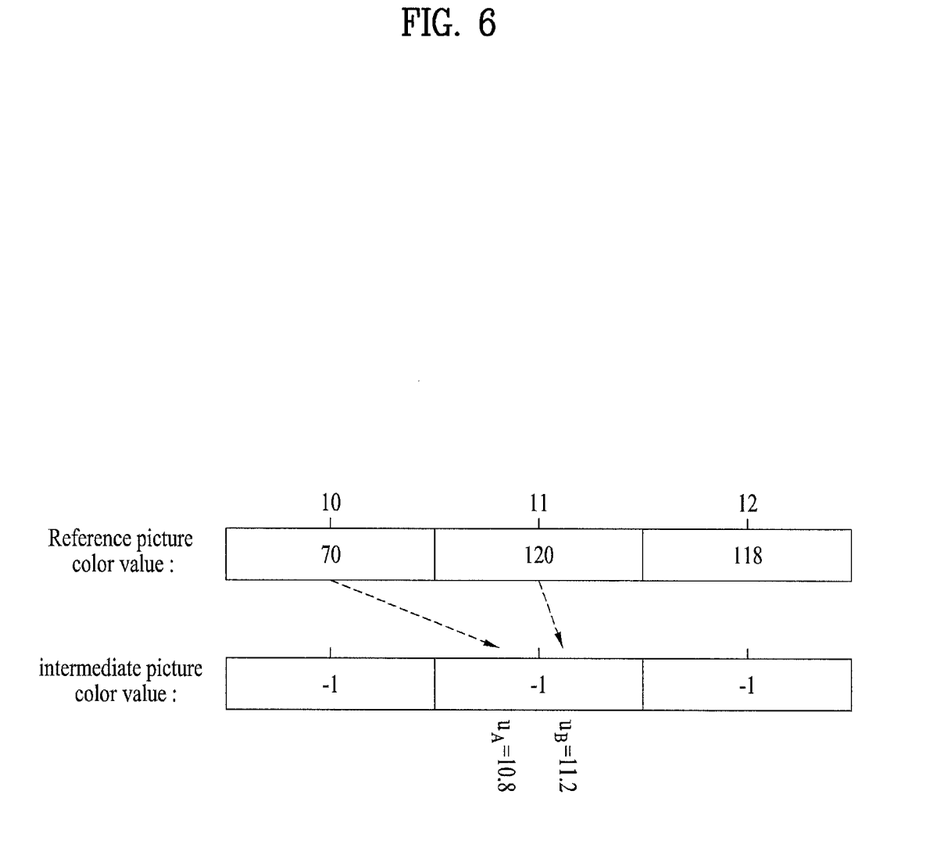
FIGS. 6 and 7 conceptually illustrate a warping method for use in an exemplary case in which a few pixels of a reference picture are mapped to one pixel of an intermediate picture.
Figure 7:
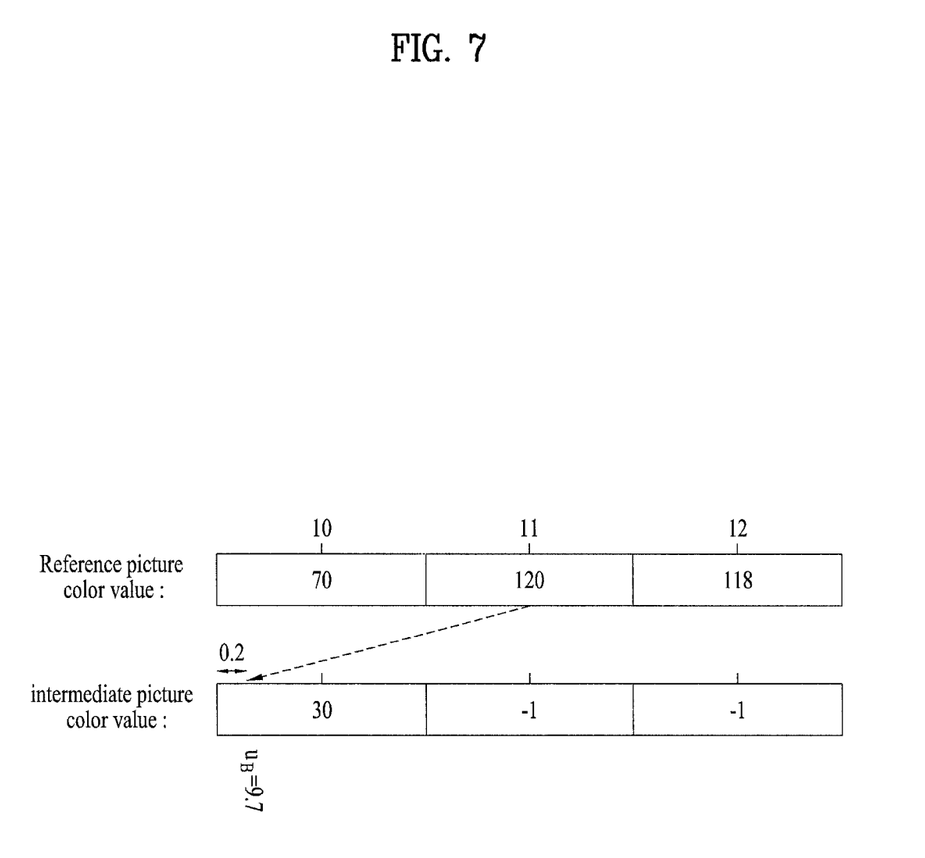

FIGS. 6 and 7 conceptually illustrate a warping method for use in an exemplary case in which a few pixels of a reference picture are mapped to one pixel of an intermediate picture.

Referring to FIG. 6, pixels (10, y) and (11, y) of the reference picture are warped to the pixel (11, y) of the intermediate picture. Color information of the intermediate picture pixel may be warped using not only the number of pixels of the reference picture warped to the virtual picture pixel but also an average of the sum of color information of the reference picture pixels. If color information of the reference picture pixel (10, y) is 70 and color information of the reference picture pixel (11, y) is 120, color information of the intermediate picture pixel (11, y) may be warped to 95.

Alternatively, a weight is added to a pixel value of the reference picture in consideration of a 2D coordinate of the intermediate picture corresponding to the reference picture pixel, and the result is then warped. Referring to FIG. 6, if the 2D coordinate of the intermediate picture corresponding to the reference picture pixel (10, y) is (10.8, y) and the 2D coordinate of the intermediate picture corresponding to the reference picture pixel (11, y) is (11.2, y), color information of the intermediate picture pixel (11, y) is represented by the following equation 9.

$$L[11]=(uB-11)/(uB-uA)*70+(11-uA)/(uB-uA)*120 \quad \text{[Equation 9]}$$

In Equation 9, L[11] is color information of the intermediate picture pixel (11, y), uA is a 2D coordinate of the intermediate picture corresponding to the pixel (10, y) of the reference picture, and uB is a 2D coordinate of the intermediate picture corresponding to the pixel (11, y) of the reference picture.

Alternatively, warping may be performed by simultaneously considering an average of color information of a few pixels of the reference picture and a 2D coordinate of the intermediate picture corresponding to the reference picture pixel. Referring to FIG. 7, the pixel (11, y) of the reference picture corresponds to the intermediate picture pixel (10, y) and color information of the intermediate picture pixel (10, y) is denoted by 30 through the previously performed warping. If the 2D coordinate of the intermediate picture corresponding to the reference picture pixel (11, y) is set to (9.7, y), the intermediate picture pixel (10, y) is affected by color information of the reference picture pixel (11, y) within the range from (9.7, y) to (10.5, y), so that warping may be performed in consideration of an associated weight. For example, color information of the intermediate picture pixel (10, y) is represented by the following equation 10.

$$L[10]=\text{round}(a*[10]'+(1-a)*\text{color\_sum}/\text{color\_count}) \quad \text{[Equation 10]}$$

In Equation 10, L[10] is color information of the intermediate picture pixel (10, y), and L[10]' is color information of the intermediate picture pixel (10, y). 'color_sum' is the sum of color information of the intermediate picture pixel obtained by the previous warping and color information of the reference picture pixel warped to the intermediate picture pixel. 'color_count' is an intermediate picture pixel and the number of pixels of the reference picture warped to the intermediate picture pixel. 'a' is how color information of the intermediate picture pixel in the previous warping process affects color information of the intermediate picture pixel in the current warping process.

However, provided that a few pixels of the reference picture are set to the intermediate picture pixels, a reference picture pixel located at a relatively long distance from a camera, from among several reference picture pixels is occluded by a reference picture pixel located at a relatively short distance from the camera, such that it is necessary to perform warping of the intermediate picture pixel using color- and depth-information of the reference picture pixel located at a relatively short distance. For this operation, pixel information (e.g., color information, depth information, and a distance variable) of the reference picture located at a relatively short distance may be used for such warping on the basis of the depth information of the reference picture pixel. For example, if a first pixel of the reference picture and a second pixel of the reference picture correspond to the intermediate picture pixels, color information and depth information of the first pixel of the reference picture are warped to color information and depth information of the intermediate picture pixel, respectively. Next, color information and depth information of the second pixel of the reference picture are warped to color information and depth information of the intermediate picture pixel, respectively. In this case, assuming that depth information of the first pixel of the reference picture is higher than depth information of the second pixel of the reference picture, this means that the first pixel of the reference picture is a pixel located at a relatively long distance as compared to the second pixel of the reference picture. Therefore, color information and depth information of the intermediate picture pixel may be replaced with color information and depth information of the second pixel of the reference picture, respectively.

In the case where a multi-viewpoint reference picture is used to synthesize a virtual picture, if there is a hole in the intermediate picture (hereinafter referred to as a first viewpoint intermediate picture) warped from the first viewpoint reference picture, the hole may be filled using a pixel value of the intermediate picture (hereinafter referred to as a second viewpoint intermediate picture) warped from the second viewpoint reference picture (S410). The term 'hole' means that a specific region in which no pixel value is allocated to the intermediate picture when the pixel value of the reference picture is allocated to the intermediate picture pixel corresponding to the reference picture pixel. The hole may be one pixel or may include a plurality of pixels. The first viewpoint reference picture and the second viewpoint reference picture may be distinguished from each other by viewpoint information, and the viewpoint information may indicate information for identifying a viewpoint including the reference picture. The pixel of the second viewpoint intermediate picture may be a pixel located at the same position as the pixel of the first viewpoint intermediate picture.

Figure 8:
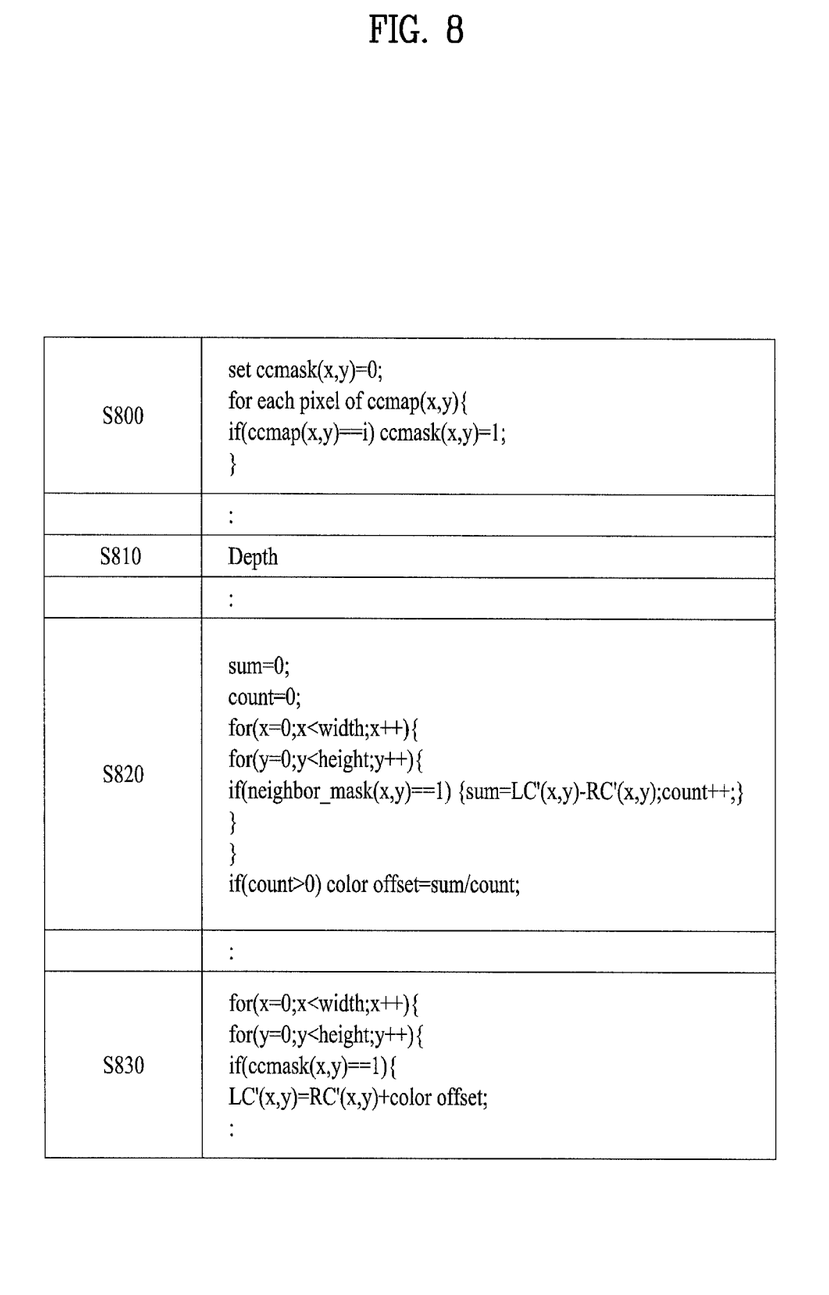
FIG. 8 illustrates a syntax that fills a hole of an intermediate picture of a first viewpoint using an intermediate picture of a second viewpoint.

FIG. 8 illustrates a syntax that fills a hole of an intermediate picture of a first viewpoint using an intermediate picture of a second viewpoint.

First, it is determined whether a hole is present in a first viewpoint intermediate picture. For example, a pixel value of 1 is allocated to a specific region in which no pixel value is allocated to the first viewpoint intermediate picture, such that the position of the hole may be specified (S800). The hole of the first viewpoint intermediate picture may be filled using a pixel contiguous to a hole of the first viewpoint intermediate picture. Although the contiguous pixel may be a pixel adjacent to the hole, the scope or spirit of the present invention is not limited thereto and the contiguous pixel may further include a pixel located in the vicinity of the hole. For example, the range of the contiguous pixel may be specified as shown in S810. A difference (i.e., a color offset value) in pixel value between a pixel contiguous to the hole of the first viewpoint intermediate picture and a pixel of the second viewpoint intermediate picture is obtained (S820). The pixel of the second viewpoint intermediate picture may be a pixel that is located at the same position as a pixel contiguous to the hole of the first viewpoint intermediate picture. The hole of the first viewpoint intermediate picture may be filled using the sum of the pixel value of the second viewpoint intermediate picture and the color offset value (S830). If a plurality of color offset values are present, any one of the color offset values may be selected and used and a color offset value of a high frequency may be used. Preferably, an average of the color offset values may be used (S820).

The first viewpoint intermediate picture and the second viewpoint intermediate picture are merged with each other, such that a virtual picture is synthesized (S420). When merging the first viewpoint intermediate picture and the second viewpoint intermediate picture, the first viewpoint intermediate picture may be merged with the second viewpoint intermediate picture in consideration of a weight dependent upon the virtual viewpoint position. For example, the first viewpoint intermediate picture and the second viewpoint intermediate picture may be merged in consideration of whether the virtual viewpoint position is close to the first viewpoint or the second viewpoint. In this case, the weight may be derived from the following equation 11.

$$a=|Rtx-Vtx|/(|Ltx-Vtx|+|Rtx-Vtx|($$ [Equation 11]

In Equation 11, a is a weight, Ltx is the position of a first viewpoint on an X-axis, Rtx is the position of a second viewpoint on an X-axis, and Vtx is the position of a virtual viewpoint on an X-axis.

Therefore, the pixel value of the virtual picture may be obtained from the following equation 12.

$$VC'(x,y)=a*LC'(x,y)+(1-a)*RC'(x,y)$$ [Equation 12]

In Equation 12, VC' is a pixel value of the 2D coordinate (x,y) of the virtual picture, LC' is a pixel value of the 2D coordinate (x,y) of the first viewpoint intermediate picture, and RC'(x,y) is a pixel value of a 2D coordinate (x,y) of the second viewpoint intermediate picture.

The pixel position of a reference depth picture having incorrect depth information may be found by comparing color information of the virtual picture or depth information of the virtual depth picture. For example, if a difference between color information of a pixel of the first viewpoint intermediate picture and color information of a pixel of the second viewpoint intermediate picture exceeds a threshold value of a color difference, or if a difference between depth information of a pixel of the first viewpoint intermediate picture and depth information of a pixel of the second viewpoint intermediate picture exceeds a threshold value of a difference in depth information, this means that depth information of the pixel of the first viewpoint intermediate picture and depth information of the pixel of the second viewpoint may be considered to be incorrect. In conclusion, a pixel of the virtual depth picture obtained by synthesizing the pixel of the first viewpoint intermediate picture and the pixel of the second viewpoint intermediate picture may have incorrect depth information. A threshold value of a difference in color or a threshold value of a difference between distance variables may be a constant that is arbitrarily decided, and may be decided by a difference between a maximum distance variable value and a minimum distance variable value.

Therefore, depth information (hereinafter referred to corrected depth information) that minimizes a difference in color information between the pixel of the first viewpoint reference picture and the pixel of the second viewpoint reference picture is obtained, and the corrected depth information may be used as depth information of the pixel of the virtual depth picture. For example, if the corrected depth information is decided, the pixel position of the first viewpoint reference picture or the second viewpoint reference picture may be determined according to the corrected depth information. Color information of the determined first or second viewpoint reference picture may be used as color information of a pixel corresponding to the virtual picture. Preferably, an average of color information of the first and second viewpoint reference pictures may be used as color information of a pixel corresponding to the virtual picture.

As described above, the decoding/encoding apparatus according to the present invention may be contained in a multimedia broadcast transmission/reception apparatus such as a Digital Multimedia Broadcasting (DMB). In addition, the multimedia broadcast transmission/reception apparatus may include a mobile communication terminal.

The decoding/encoding method disclosed in the present invention may be implemented in the form of program commands executable by a variety of computer means, and recorded on a computer-readable recording medium. Multimedia data including the inventive data structure may be stored in a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The bitstream generated by the above-mentioned encoding method may be stored in a computer-readable recording medium or may be transmitted over a wired/wireless communication network.

The embodiments of the present invention may be used to synthesize a virtual picture.

As apparent from the above description, the video signal processing method according to embodiments of the present invention synthesizes a virtual picture using a reference picture so as to reduce the amount of information obtained by coding a virtual viewpoint picture, thereby effectively processing a video signal. In addition, if pixels of one or more reference pictures are mapped to a pixel of one intermediate picture, the video signal processing method selects a reference picture pixel warped to the intermediate picture pixel on the basis of depth information of the one or more reference picture pixels, and a pixel located at a relatively remote site is not warped and only a pixel located at a relatively short distance is warped, such that a virtual viewpoint picture can be correctly synthesized. In addition, if there is a hole in an intermediate picture of a first viewpoint, the video signal processing method obtains a difference value between a first pixel adjacent to the hole and a pixel of an intermediate picture of a second viewpoint that is located at the same position as the first pixel, and allocates the sum of the difference value between pixels and a pixel value of the intermediate picture of the second viewpoint located at the same position as the hole to the hole, such that a virtual picture can be more correctly synthesized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a video signal, the method comprising:
    generating a first viewpoint intermediate picture and a second viewpoint intermediate picture by warping a first viewpoint reference picture and a second viewpoint reference picture wherein, when a plurality of pixels of the first viewpoint reference picture are mapped to a pixel of the first viewpoint intermediate picture, generating the first viewpoint intermediate picture comprises:
        obtaining position information in the first viewpoint intermediate picture corresponding to the plurality of pixels of the first viewpoint reference picture;
        obtaining a pixel value of the pixel of the first viewpoint intermediate picture based on pixel values of the plurality of pixels of the first viewpoint reference picture and the position information; and
        modifying the pixel value of the pixel of the first viewpoint intermediate picture based on a number of the plurality of pixels of the first viewpoint reference picture and the pixel of the first viewpoint intermediate picture and a sum of the pixel values of the plurality of pixels of the first viewpoint reference picture and the pixel value of the pixel of the first viewpoint intermediate picture;
    determining whether a hole is present in the first viewpoint intermediate picture;
    based on a determination that a hole is present in the first viewpoint intermediate picture, specifying a position of the hole;
    obtaining a pixel value of the second viewpoint intermediate picture on the basis of the position of the hole in the first viewpoint intermediate picture;
    obtaining differential pixel values between pixels of the first viewpoint intermediate picture that are contiguous to the hole and pixels of the second viewpoint intermediate picture that are located at positions in the second viewpoint intermediate picture corresponding to positions of the pixels in the first viewpoint intermediate picture that are contiguous to the hole; and
    allocating, to the hole, a sum of an average of the differential pixel values and the pixel value of the second viewpoint intermediate picture,
    wherein the hole is a specific region in which no pixel value is allocated to the first viewpoint intermediate picture.

2. The method according to claim 1, wherein the first viewpoint reference picture and the second viewpoint reference picture are distinguished from each other by viewpoint information, wherein the viewpoint information is used to identify a first viewpoint to which the first viewpoint reference picture pertains and a second viewpoint to which the second viewpoint reference picture pertains.

3. The method according to claim 1, wherein the pixel value of the second viewpoint intermediate picture is obtained from a pixel located in the second viewpoint intermediate picture at a position corresponding to a position of the hole in the first viewpoint intermediate picture.

4. The method according to claim 1, wherein the pixels contiguous to the hole include pixels which are located at a left side, a right side, an upper side, a lower side, a left upper side, a left lower side, a right upper side, and a right lower side of the hole.

* * * * *